(12) United States Patent
Chen et al.

(10) Patent No.: US 11,663,662 B2
(45) Date of Patent: May 30, 2023

(54) AUTOMATIC ADJUSTMENT OF LIMITS BASED ON MACHINE LEARNING FORECASTING

(71) Applicant: Brex Inc., Draper, UT (US)

(72) Inventors: Bryant Chen, Oakland, CA (US); Lillian Xu, Emeryville, CA (US); Jeanette Jin, San Francisco, CA (US)

(73) Assignee: Brex Inc., San Francisco, CA (US)

(*) Notice: Subject to any disclaimer, the term of this patent is extended or adjusted under 35 U.S.C. 154(b) by 0 days.

(21) Appl. No.: 17/560,114

(22) Filed: Dec. 22, 2021

(65) Prior Publication Data

US 2023/0005055 A1 Jan. 5, 2023

Related U.S. Application Data

(60) Provisional application No. 63/217,182, filed on Jun. 30, 2021.

(51) Int. Cl.
*G06Q 40/00* (2023.01)
*G06Q 40/03* (2023.01)
*G06N 20/00* (2019.01)
*G06F 18/214* (2023.01)

(52) U.S. Cl.
CPC .......... *G06Q 40/03* (2023.01); *G06F 18/2148* (2023.01); *G06N 20/00* (2019.01)

(58) Field of Classification Search
CPC ...... G06Q 40/02; G06Q 40/025; G06N 20/00; G06K 9/6257
USPC .................................................. 705/4, 35–45
See application file for complete search history.

(56) References Cited

U.S. PATENT DOCUMENTS

| | | | |
|---|---|---|---|
| 2007/0156557 A1* | 7/2007 | Shao | G06Q 40/025 705/35 |
| 2011/0022541 A1 | 1/2011 | Miles et al. | |
| 2017/0046781 A1 | 2/2017 | Kalimuthu et al. | |
| 2018/0300171 A1* | 10/2018 | Qiao | G06N 20/00 |
| 2019/0311428 A1 | 10/2019 | Adjaoute | |
| 2019/0355058 A1 | 11/2019 | Huang | |
| 2021/0349743 A1* | 11/2021 | Panchomarthi | H04L 9/3213 |
| 2022/0058513 A1* | 2/2022 | John | G06N 20/00 |
| 2022/0067825 A1 | 3/2022 | Shapiro | |

* cited by examiner

*Primary Examiner* — Jessica Lemieux
*Assistant Examiner* — Mohammed H Mustafa
(74) *Attorney, Agent, or Firm* — Haynes and Boone, LLP

(57) ABSTRACT

There are provided systems and methods for automatic adjustment of limits based on machine learning forecasting. An entity, such as company or other entity, may purchase items utilizing a payment instrument or card provided to the company by a credit provider system or entity. In order to provide proper underwriting for credit extensions, such as balances and limits of extendable credit, the credit provider system may utilize a forecasting machine learning (ML) model trained to predict a future global balance of funds or a likelihood of repayment of the extended credit limit. This may be based on information retrievable balances from a banking system and a staleness of this data. When the data is stale and has not been updated, the forecasted balance may have a wider range, and thus risk factors may designate less risky and lower limits.

22 Claims, 7 Drawing Sheets

AUTOMATIC ADJUSTMENT OF LIMITS BASED ON MACHINE LEARNING FORECASTING

CROSS-REFERENCE TO RELATED APPLICATIONS

This application claims priority to and the benefit of U.S. Provisional Patent Application No. 63/217,182, filed on Jun. 30, 2021, the contents of which are hereby incorporated by reference in their entirety.

TECHNICAL FIELD

The present application generally relates to intelligent machine learning (ML) models and systems and more specifically to training an ML model for automatic adjustment of credit limits by predicting and forecasting entity behavior.

BACKGROUND

Service provider systems may provide services to customers, such as businesses and companies, through computing systems and networks. These services may include credit or loan underwriting that may extend a credit limit or balance to customers repayable at set billing cycles in return for the risk (and corresponding fees or payment) that is taken by extending such credit. The service provider may track customer data using expense management software, hardware, and other infrastructure to manage expenses and control user transactions. This includes issues with establishing and issuing payment instruments, tracking expenses and other accounting requirements, enforcing expense policies, and collecting auditing information and other transaction history data. However, conventional computing systems may merely establish rules about services that are extendable to customers. These conventional systems attempt to predict whether a customer may repay, however, may not accurately predict or forecast customer behaviors. This may adversely affect both the conventional systems, such as by increasing risk and/or fraud, as well as customers and other entities that may not receive proper extensions and offers of services.

Therefore, there is a need to address deficiencies with conventional computing systems used by service providers to forecast behaviors that predictively provide services to customers.

Figure 1:
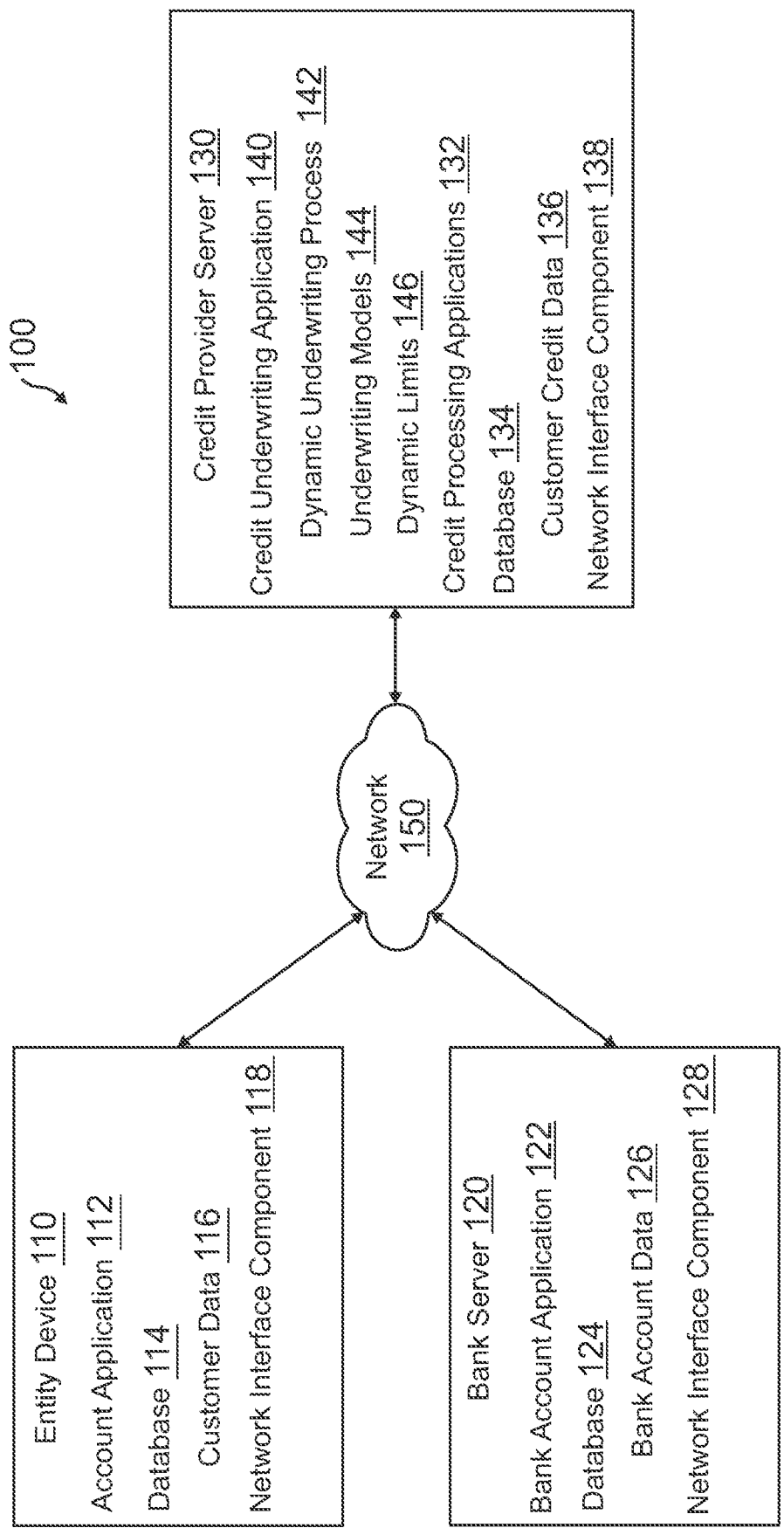
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for automatic adjustment of limits based on machine learning forecasting. Systems suitable for practicing methods of the present disclosure are also provided.

In service provider systems, such as credit provider systems and other financial service providers, underwriting systems may be utilized to extend credit or other loaned customers and other entities, such as businesses and companies, based on risk assessment and risk analysis processes performed by the service provider systems. With new companies, such as start-up businesses and enterprises, underwriting systems may have difficulty determining and adjusting extended balances due to the lack of data available for the start-up business, which affects the risk analysis processes for the underwriting systems. Further, the start-up businesses may have different and difficult to ascertain resources, which may further affect underwriting procedures. In order to solve these issues with lack of data for data processing of underwriting systems, an underwriting system may instead utilize intelligent decision-making through machine learning (ML) models that may predict data based on initial data input features. One or more ML models may take, as input, features and parameters for a business' or other entity's available data and predict, based on training data features and trained ML model layers, a risk assessment that may be associated with a probability of default and/or a forecasted global balance (e.g., account cash balance that an entity may have available with one or more financial institutions and/or in one or more accounts) available to the entity at a particular time or date. This allows a processing engine and operations of the underwriting system to dynamically adjust available credit or other extended loan balances and data in a predictive manner.

An online credit and expense management system may provide data aggregators that monitor an entity's bank accounts and other financial accounts to determine global credit limits and available funds, cash or funds burn rate, and/or staleness of the aforementioned data. The financial accounts may include one or more credit accounts, debit cards, direct debit/credit through automated clearing house (ACH), wire transfers, gift cards, and other types of funding sources that may be issued to the entity by the online system and/or other financial service providers (e.g., banks). Thus, a networked system and provider may include a framework and architecture to provide payment gateways, billing platforms, eCommerce platforms, invoicing, and additional services. For example, a credit and underwriting provider system may offer services, software, online resources and portals, and infrastructure used to provide underwriting for the entity's (e.g., a business or company) available credit or loans, as well as operations for expenses, purchases, and other financial transactions.

The credit provider system may provide an electronic data processing framework that integrates into a payment network and/or computing system of a financial service provider at a point that allows for real-time data acquisition and/or periodic data retrieval and/or updating of global available balances and/or fund burn rates. For example, integration of the framework at a network node or point at or between an issuing and/or acquiring bank may allow for data about accounts and balances for an entity to be received in real-time, and thus the framework may perform real-time data processing. The data may also be acquired at certain intervals, such as from a pull and/or retrieval for the request from the corresponding banking system for the entity. Additionally, the system's framework may integrate with one or more client devices (e.g., personal computers, mobile devices, etc.), online scheduling resources, personnel management systems, and/or enterprise business software to receive data for an entity.

Finally, the entity may be required to select payment networks utilized for issuance of payment instruments and transaction processing, which may include payment cards, direct debit, payment wires, or other types of funding sources. The payment networks may correspond to resolution networks for payment processing using an account identifier, payment card, or the like during electronic and in-person transaction processing. These payment networks and financial service providers (e.g., banks and banking computing systems) may be selected and integrated with in order to determine and process data for entities when performing intelligent underwriting, as discussed herein.

In this regard, an entity, such as a company or other organization, may request credit underwriting and extension of credit from an underwriting system of a credit service provider, e.g., through a loan or credit account that provides one or more payment cards or other financial accounts. Initially, the entity may be onboarded by providing necessary documents to verify the entity's identity and/or business standing, such as incorporation documents, EIN, tax status and/or documents, and the like. In order to be processed for credit underwriting, the entity may further be required to provide certain data regarding the entity's financial status, accounts, and balances, such as initial seed money, investments, and global available balance(s) that may be used for repayment of extended credit or loans. In this regard, the entity may provide access or a link to, such as through an integration with one or more banking systems utilized by the entity for one or more available balances of funds. The entity may further provide information that may be used by one or more ML models to determine a cash or funds burn rate, as well as information associated with expenditures of the entity and how quickly the entity uses funds and/or what expenses the entity has.

The entity may be initially provided an extension of credit or other available balance, such as via one or more underwriting rules-based and/or ML model-based engines. In order to use this extension of credit, one or more payment instruments may be issued to users or employees of the entity, including sales, management, information technologies, or other employees. The payment instruments may correspond to various types of payment cards and/or account identifiers, which may be issued by the expense management system or by an associated partner (e.g., an issuing bank that provides credit cards or other financial instruments). During the course of business, an employee may engage in commerce with one or more merchants using a payment instrument, such as by making an in-person (e.g., at a merchant location or store) or online purchase from the merchant. Thus, the user may request electronic transaction processing through the account number or payment instrument identifier(s) provided to the user. Merchants (e.g., a seller or payment receiver, such as a business, fundraiser, healthcare provider, landlord, etc.) may correspond to any person or entity selling goods and/or services (referred to herein as an "item" or "items") to the company's employees. Data accrued over time for the entity's expenditures, such as an expense management system provided by the credit service provider, may be further used to determine global available balances, burn rates, probability of default, and/or other assessments of the entity's risk.

However, changes to available data may cause different underwriting rules and models to determine and output different available credit and/or credit extensions at different points in time and/or based on different data. For example, the entity may go through expenses and reduce their global available balances of funds, investments, or cash in one or more accounts. This may also affect burn rate, and therefore the entity may be expected to have more or less funds at different points in time (e.g., when the burn rate is lower or higher, respectively). Thus, the credit service provider may wish to change the extended credit limit based on their underwriting rules and/or models. However, previous inflexible systems may merely look at a probability of default prediction, which may only consider stale data (e.g., data for the entity that is one or more days, weeks, months, etc., old). This can result in the credit service provider either overly adjusting an extended credit limit, which may impact the entity's available credit negatively and experience, or not sufficiently adjusting the extended credit limit, which may risk repayment when insufficient global funds are available to the entity.

In this regard, the credit service provider may utilize an ML engine and one or more forecasting ML models to forecast a predicted global balance for the entity at a specific time or date, such as at a closing time or period for a billing cycle. The one or more forecasting models may be trained even without default data for the entity. The credit service provider may obtain training data for the forecasting ML models from one or more entities utilizing the credit service provider or a similar service provider. The data may correspond to global balances over time, changes to global balances over time (e.g., burn rate and/or processed transactions), variance due to staleness or other acquisition of data, and/or other behaviors of entities over time with regard to their available global balances and/or credit balances. Data features corresponding to this data may be extracted from the training data and used to train one or more ML models. When training the ML models, an exponential smoothing model and training framework may be used for training forecasting by one or more ML models, such as exponential smoothing forecasting. This may be trained using balances over time, transactions, and behaviors of the entities (e.g., burn rate and processed transactions). Further, with the data, large, abnormal, or single transactions for the entity may be excluded, such as those that may occur rarely or on a single basis and therefore not continue to contribute to burn rate.

In further embodiments, predicting a probability of default and/or delinquency (PD) ML model may further be trained using extracted training data, such as using XG Boost model training or other tree-based algorithm training (e.g., gradient boosting machine (GBM) models). The PD ML model may then segment entities into high, medium, and low risk based on their likelihood of repayment at the end of the billing cycle. The training data, and corresponding extracted features or attributes for model training, may be based on actual missed payments by the entity and/or other entities, and may utilize an affordability score as a risk measurement to determine whether entities will actually repay at a due date for account repayment. In this regard, a cash-based PD underwriting ML model may be used to predict and/or output the affordability score based on input features for the entity, the entity's global cash balance at a specific time, expenses and/or burn rates, historical spend or changes to a global cash balance, a staleness factor since data updating, and the like. Thereafter, one or more risk rules, models, and engines may be used to determine adjustments to an extended credit limit when dynamically underwriting an entity based on the affordability score determined from the ML model.

For example, another affordability ML model may be used, after setting of a limit using the PD ML model, to determine if a score meets or exceeds a threshold, and thereafter dynamically adjust the available balance. This may allow for the level of the credit limit or balance to be less volatile with single large transactions, while accounting for increased or decreased burn rate. This may assist in creating less volatility at end of statement or billing cycle payments, which may have a large transaction for payment of a cycle, which affects dynamic forecasting of a credit balance and/or extended credit limit at certain times (e.g., end of a billing cycle and start of a next cycle). Further, a confidence interval for the affordability score may be used, which may add a range based on different risk thresholds and/or tiers for entities. This may also be set with the risk and underwriting system based on risk rules. A threshold limit or adjustment for the confidence interval may be utilized in order to determine when to dynamically adjust a credit limit or the like (e.g., at what date and based on what new data for the entity, such as an updated or refreshed global cash balance).

When training an ML model, the extracted features are used as training data at an input layer, which is then used to weigh, balance, and assign values to nodes within hidden layers of the ML model. The training data may include annotated or unannotated data, for supervised or unsupervised learning, respectively, which is used to train and adjust each node. Each node may represent a mathematical relationship to other nodes within the model and between interconnected layers that represent decisions, such as in a decision tree. For example, an input layer may be interconnected to nodes within a first hidden layer, which may then be interconnected to nodes within a next hidden layer, and so on until an nth-hidden layer is the final hidden layer. This nth-hidden layer is then connected to output nodes or decisions, which provide a prediction and/or forecast that is learned from the training data by a computing system. Feedback from one or more data scientists may be used to adjust the value, weight, and/or relationship of nodes and more accurately provide predictions and forecasts. Once trained, the ML model(s) may be deployed in an intelligent underwriting system, which may provide predictive analysis without user input for dynamic balance adjustments. Thus, the underwriting system may provide predictive forecasting of an available global balance over time and at an end of a billing cycle for an entity. In various embodiments, one or more risk rules may also be implemented as safeguards to incorrect predictions, such as based on static rules allowing or preventing certain actions by the computing system.

Thereafter, the intelligent underwriting system may receive data for a credit or loan account of an entity that has an available balance extended by the credit service provider. The intelligent underwriting system may utilize the ML model(s) to predict and/or forecast a global available balance for the entity at a closing time for a billing cycle or repayment date of the credit account (e.g., to pay off a used amount of the available credit limit). The data for input to the ML model(s) may correspond to the current available global balance for the entity (or a last known available global balance with stale data), a burn rate of cash or other funds from expenses, and/or a staleness factor of how old the available data is with the credit service provider. For example, the global balance and/or burn rate may be determined using an integration with a banking computing network and/or system of a bank for the entity. However, the data may also be received from other sources, including users at the entity. The data may be required to be updated daily or some other interval, where if not updated, the data may be considered stale. With stale data, a staleness factor may be used as input to the ML model(s), which may affect a predictive confidence range or interval by increasing the size as old data may be less predictable.

The balance forecast for the global available balance of the entity may correspond to a predicted amount of funds that the entity may have available at this date. The balance forecast further includes a predictive confidence interval, such as a range, of predictive funds the entity may have available for their global balance. For example, an upper range may correspond to a 25% likelihood of having those available funds, while a lower range may correspond to a 75% likelihood of having those available funds. This interval may be affected in size, and lower ranges may be selected, based on the staleness factor of the data, such as by increasing the range and/or selecting lower ranges that have a higher likelihood of available funds (and thus repayment). Thereafter, based on this confidence interval and one or more risk rules or factor for the entity, the underwriting system, and/or other risk models, the intelligent underwriting system may automatically adjust, either up or down, the available balance for the entity with the credit account. Once predicted and dynamically adjusted, the credit service provider may continually or periodically adjust the available balance for the entity. This may occur daily or after another time-based interval, when new data is received (e.g., when stale data is updated, and a staleness factor is changed to reflect new data), or at another time.

When using the extended credit to process a payment, the credit provider system may receive transaction data for the payment request from the payment network, for example, when the acquirer (e.g., the acquiring bank for the merchant that processes the payment instrument provided by the user) requests processing with the issuer (e.g., the issuing bank of the entity and/or credit provider system that issues the payment instrument). This occurs when the user causes a transaction to be generated, and the merchant generates a total for the transaction request, which the user can pay for by providing a payment instrument to the merchant. After receiving the payment instrument, the merchant may cause a payment request to be generated for payment of the transaction. In various embodiments, the user may be required to enter additional checkout information, such as a name, delivery location, or other personal or financial information that may be included in the transaction data for the transaction. In some embodiments, the payment instrument may previously be tokenized by the expense management system in order to further protect from fraud, where the digital token allows for backend identification of the payment instrument to the issuer and/or expense management system without exposing payment credentials.

In this regard, real-time bank data may be used to update ML model predictions quickly (e.g., hourly, daily, etc.) and, based on one or more updated predictions, the service providers processing engines may decide on whether to change a credit limit or other service extended to a user. Conventional ML underwriting ML models may not have real-time connections to data sources in order to provide faster and/or more real-time underwriting decisions. Thus, the updated prediction may be outside a confidence interval for an initial prediction utilized by conventional systems. If so, then the updated prediction may be considered more than noise and used to update the corresponding extended service. However, the ML models and engine may use a balance forecasting model in order to predict and account balance or other forecasted metrics. This may then be subsequently updated at later time intervals. The ML models for balance forecasting may be trained without default data for an entity, but instead assess whether a startup customer or other entity may default based on whether the entity has an available balance. This may be advantageous with certain entities that may have large available balances (e.g., cash), but little revenue, so their ability to repay debt is primarily based on how much cash the entity has on hand.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a customer or entity device 110, a bank server 120, and a credit provider server 130 in communication over a network 150. A user (not shown) may correspond to an employee, contractor, shareholder, or other suitable person of a company (not shown and generally referred to herein as an "employee") associated with entity device 110, which may utilize a credit account for a credit limit or balance extended by credit provider server 130. Credit provider server 130 may dynamically adjust this credit balance using underwriting and forecasting ML models for a global available balance, which may process data received from bank server 120.

Entity device 110, bank server 120, and credit provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Entity device 110 may be utilized by an employee of an entity or company that employs one or more users, for example, to utilize a credit account and extended line of credit or other loan for funds from credit provider server 130. For example, in one embodiment, entity device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In this regard, entity device 110 includes one or more processing applications which may be configured to interact with credit provider server 130 to manage payment instruments provided by credit provider server 130 and further provide data utilized by credit provider server 130 when underwriting for credit or other loans. Although only one communication device is shown, a plurality of communication devices may function similarly.

Entity device 110 of FIG. 1 includes an account application 112, a database 114, and a network interface component 118. Account application 112 may correspond to executable processes, procedures, and/or applications with associated hardware. In other embodiments, entity device 110 may include additional or different modules having specialized hardware and/or software as required.

Account application 112 may be implemented as specialized hardware and/or software utilized by entity device 110 to access an account and provide data for the account, such as a credit account for an entity associated with entity device 110 that is managed and provided by credit provider server 130. In this regard, account application 112 may correspond to software, hardware, and data utilized by a user associated with entity device 110 to enter, store, and process data associated with an account. This data may correspond to global available funds for the entity associated with entity device 110, transaction histories and fund expenses associated with the global funds and a burn rate of those funds, and the like (e.g., other account and/or funding information for a business). Account application 112 may retrieve and/or access this data from an external financial institution or computing system, such as bank server 120. Account application 112 may be integrated with credit provider server 130 so that data may be shared with credit provider server 130 for transactions, for example, by providing global account balances and funding data from bank server 120 periodically by an automated data sharing process and/or on command by a user using entity device 110. In further embodiments, account application 112 may access an online platform and database that provides the global balance and funds data and/or permit credit provider server 130 access to the online platform, such as by providing information to allow access to the data using an integration between computing systems for bank server 120 and credit provider server 130.

In various embodiments, account application 112 may include a general browser application configured to retrieve, present, and communicate information over the Internet (e.g., utilize resources on the World Wide Web) or a private network. For example, account application 112 may provide a web browser, which may send and receive information over network 150, including retrieving website information, presenting the website information to the user, and/or communicating information to the website, including payment information. However, in other embodiments, account application 112 may include a dedicated application of credit provider server 130 or other entity, which may be configured to assist in establishing and maintaining credit accounts, providing global balance and burn rate data, and/or utilizing payment networks.

Entity device 110 may further include database 114 stored in a transitory and/or non-transitory memory of entity device 110, which may store various applications and data and be utilized during execution of various modules of entity device 110. Thus, database 114 may include, for example, identifiers such as operating system registry entries, cookies associated with account application 112, identifiers associated with hardware of entity device 110, or other appropriate identifiers, such as identifiers used for payment/account/device authentication or identification. Database 114 may include customer data 116 input by a user and/or received from bank server 120 and/or credit provider server 130 for use with forecasting an available global balance for an entity associated with entity device 110, such as global balance data and burn rate information.

Entity device 110 includes at least one network interface component 118 adapted to communicate with bank server 120, credit provider server 130, and/or another device or server. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices.

Bank server 120 may correspond to a computing system and/or network utilized for global cash of fund balances within accounts, such as bank and/or financial accounts of funds available to business entities. Bank server 120 may further provide resolution of payment requests and electronic transaction processing, which may be governed by permissions (e.g., acceptances and denials) of payment requests for transaction processing by credit provider server 130. In this regard, bank server 120 may provide one or more accounts that include global balances available to an entity associated with entity device 110, such as bank accounts and other accounts that include assets of the business entity.

In this regard, bank server 120 may correspond to an acquiring and/or issuing bank or entity that may hold accounts for users and/or assist in resolving payments including those to pay for extended credit and balances to the entity associated with entity device 110. Bank server 120 includes one or more processing applications which may be configured to interact with entity device 110 and/or credit provider server 130 to facilitate processing of payments and provide information about global balances available to the entity, burn rate of those balances, and the like. However, bank server 120 may be maintained by or include other types of credit providers, financial services providers, and/or other service provider. Although only one bank server and entity are shown, a plurality of banks and their corresponding computing systems may function similarly and include data for global balances and burn rates.

Bank server 120 of FIG. 1 includes a bank account application 122, a database 124, and a network interface component 128. Bank account application 122 may correspond to executable processes, procedures, and/or applications with associated hardware. In other embodiments, bank server 120 may include additional or different modules having specialized hardware and/or software as required.

Bank account application 122 may correspond to specialized hardware and/or software to allow businesses, companies, and other entities to open, maintain, and utilize bank accounts or other financial accounts that may have real or virtual assets corresponding to available global balances of cash or other funds, such as during the course of business for expenses and other business payments. In some embodiments, bank server 120 may include or be connected with an online banking resource for a bank utilized by entity device 110 and/or credit provider server 130 to maintain global balances and resolve fees and payments. However, in other embodiments, bank account application 122 may correspond to other types of payment networks and payment types, such as direct debit payments (ACH payments), wire exchanges or payments, prepaid card payments, or regionally/company-specific payments. Bank account application 122 may establish and maintain, on request by entity device 110, one or more financial accounts having a global available balance of funds, and may allow authorized users (e.g., users of the entity) to interact with the network to access and provide global balance data, process transactions, allow third parties (e.g., credit provider server 130 or other financial service intermediaries) to interact on the network on behalf of the entity, and/or access or use data provided to or from the payment network. Thus, credit provider server 130 may utilize bank account application 122 in the managing, approving, and/or denying intelligent underwriting credit or loan extensions and limits, as well as forecasting available global balances at specific times or dates for further dynamically adjusting those limits.

Bank server 120 may further include database 124 stored in a transitory and/or non-transitory memory of bank server 120, which may store various applications and data and be utilized during execution of various modules of bank server 120. Thus, database 124 may include, for example, identifiers such as operating system registry entries, identifiers associated with hardware of bank server 120, or other appropriate identifiers, such as identifiers and credentials used for account identification and/or authentication. Database 124 may include bank account data 126 for one or more bank accounts, which may be used to establish global balance data and burn rate information.

Bank server 120 includes at least one network interface component 128 adapted to communicate with entity device 110, credit provider server 130, and/or another device or server. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices.

Credit provider server 130 may be maintained, for example, by an online service provider, which may provide payment instruments and credit or loan underwriting services to companies, businesses, and other entities. In this regard, credit provider server 130 includes one or more processing applications which may be configured to interact with entity device 110, bank server 120, and other devices or servers to facilitate processing of payments and enforcement of dynamic credit or loan limit adjustments. In one example, credit provider server 130 may be provided by BREX®, Inc. of San Francisco, Calif., USA. However, in other embodiments, credit provider server 130 may be maintained by or include other types of credit providers, financial services providers, and/or other service provider, which may provide underwriting and credit services to companies.

Credit provider server 130 of FIG. 1 includes a credit underwriting application 140, a credit processing application 132, a database 134, and a network interface component 138. Credit underwriting application 140 and credit processing application 132 may correspond to executable processes, procedures, and/or applications with associated hardware. In other embodiments, credit provider server 130 may include additional or different modules having specialized hardware and/or software as required.

Credit underwriting application 140 may correspond to specialized hardware and/or software to allow entities (e.g., the entity associated with entity device 110) to receive payment instruments associated with a bank account and funding of the company (e.g., their global available balance), such as one or more company credit cards. Credit underwriting application 140 may further provide management for those issued payment instruments and additional funds/accounts of the company, such as by dynamically adjusting credit and/or loan extension limits and caps. In this regard, a company may first establish an account with credit underwriting application 140 by providing company data and onboarding through credit underwriting application 140. Such information may include bank account and funding information, such as verified funding from investors, available funds directly in an account with bank server 120, and a burn rate of company funds over a time period. If qualified based on underwriting policies, rules, and/or models, credit provider server 130 and/or another issuing entity may provide a payment instrument that is managed by credit underwriting application 140. For example, credit provider server 130 may issue one or more credit cards for employees of the entity, which may correspond to a real or virtual credit card or other types of payment instruments and instrument identifiers that may be used for company payments.

Credit underwriting application 140 further includes a dynamic underwriting process 142 that may perform dynamic adjustment of credit limits and extended balances for credit accounts and other loans extended to entities using underwriting models 144. In this regard, dynamic underwriting process 142 may include one or more processed to train underwriting models 144, which may correspond to ML models. In various embodiments, one or more of underwriting models may correspond to an exponential smoothing ML model that may forecast an expected or predicted global balance at a particular time or data. This may correspond to a confidence interval or range that designates different percentage likelihoods and risk of an entity having a particular global balance of funds available for payment of a user credit limit. In other embodiments, the trained ML models of underwriting models 144 may correspond to a predictive delinquency or deficit model that uses an XG Boost ML model to rank or assign entities into risk categories based on their prediction of deficit for credit limits and amounts, and therefore determine a predicted global balance at the particular time or date.

Underwriting models 144 may be trained by dynamic underwriting process 142 by extracting training features for annotated or unannotated training data. Different layers of underwriting models may then be trained using the features, as discussed in further detail with regard to FIG. 2. Once trained, underwriting models 144 may be used to adjust dynamic limits 146, such as by dynamically adjusting over time based on different forecasted global balances of funds over time. This may change as a time period approaches a closing time for a billing statement or cycle, which may also be affected by a staleness factor based on a last time of acquisition of a global balance and/or burn rate of the global balance for the entity. Using the global balance, burn rate, and staleness factor, a forecasted or predicted global balance, including a confidence interval, may be determined for dynamic limits 146. Thereafter, dynamic underwriting process 142 may adjust dynamic limits 146 for one or more credit accounts and provide notification of new limits to entity device 110.

Credit processing application 132 may correspond to specialized hardware and/or software to allow entities (e.g., the entity associated with entity device 110) to process financial transactions using one or more company credit cards or other financial instruments issued by credit underwriting application 140. Credit processing application 132 may therefore correspond to one or more processes to receive transaction data, which may include information about the transaction (e.g., cost, items, additional fees including tax or tip, merchant identifier, description, and the like) and an identifier for the entity associated with entity device 110 and/or the used payment instrument (e.g., credit card number for the credit account). Credit processing application 132 may then utilize one or more payment networks to process the transaction, such as by issuing a payment over a payment network and/or by requesting payment by a credit issuing bank or institution to the merchant and/or acquiring bank or institution. In other embodiments, the credit card and payment network may be managed by another entity and/or payment network, where an integration by credit provider server 130 with the network may allow for acquisition of transaction data by credit processing application 132. Credit processing application 132 may further issue transaction histories and provide accounting and recordation of transaction data. In various embodiments, data accrued from credit processing application 132 may further be used as additional information to determine a global balance of funds for the entities using credit provider server 130, as well as burn rates based on expenses and additional expenditures (e.g., using the extended credit limit, which may be repaid and therefore used to determine a burn rate and/or outlier transactions that may be excluded from a burn rate).

Additionally, credit provider server 130 includes database 134. As previously discussed, the user, entity, and/or entity corresponding to entity device 110 may establish one or more accounts with credit provider server 130, which may be used to underwrite for credit limits and extensions. Payment accounts in database 134 may include customer credit data 136 and other entity information, such as name, address, payment/funding information, additional user financial information, and/or other desired entity data. Customer credit data 136 may further include information used during ML model decisions and forecasting for underwriting, such as global balance data, burn rate, and/or information necessary to retrieve that information (e.g., account credential or identifiers, access permissions, and the like). Database 134 may also be used to store transaction data and information on issued payment instruments to entities and transactions processed using those instruments.

In various embodiments, credit provider server 130 includes at least one network interface component 138 adapted to communicate with entity device 110, bank server 120, and/or other devices or servers over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices.

Network 150 may be implemented as a single network or a combination of multiple networks. For example, in various embodiments, network 150 may include the Internet or one or more intranets, landline networks, wireless networks, and/or other appropriate types of networks. Network 150 may correspond to small scale communication networks, such as a private or local area network, or a larger scale network, such as a wide area network or the Internet, accessible by the various components of system 100.

Figure 2A:
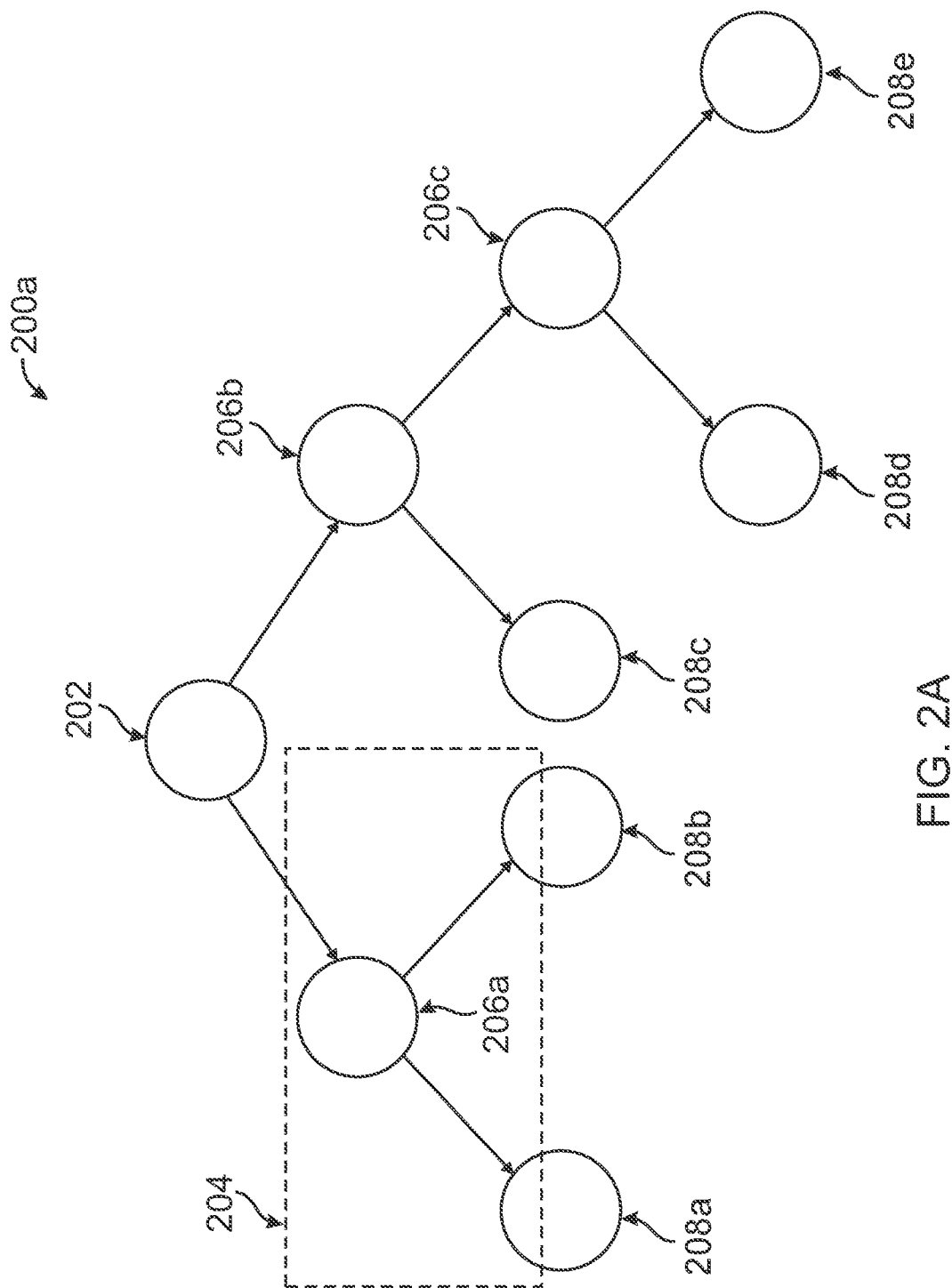
FIG. 2A is an exemplary decision tree of a machine learning model representing an algorithm trained to perform predictive forecasting of credit limits, according to an embodiment.

FIG. 2A is an exemplary decision tree 200a of a machine learning model representing an algorithm trained to perform predictive forecasting of credit limits, according to an embodiment. Decision tree 200a of FIG. 2A corresponds to a representation of a decision tree utilized by certain ML models and training when performing predictive decision-making and/or forecasting, such as an XG Boost model. Decision tree 200a may therefore include nodes that are trained using a mathematical algorithm to assign different weights and/or values for decision-making at decision nodes to provide output and output nodes. Decision nodes may include an initial input node and hidden nodes with additional decision-making when arriving at an output decision and node.

At an input decision node 202, an initial input information or feature may be provided, which may cause a decision to be made based on the mathematical representation (e.g., computation or algorithm) of the decision at input decision node 202. For example, input decision node 202 may be connected to further decision nodes 206a, 206b, and 206c in one or more additional hidden layers. A decision made at input decision node 202 may be performed based on the training dataset that allows for attributes in the values provided as input to be compared to the root attributes and training data set. Based on the comparison and the mathematical model and algorithm, a decision may be made to proceed to one of decision nodes 206a-c. As shown in decision tree 200, a separate subtree 204 may be created for decision node 206a, which causes output as one of output nodes 208a or 208b. The further decision-making and outputs are further caused based on additional comparison of input features and attributed to training data feature and attributes in the root data set, as well as the mathematical algorithm used to create decision tree 200a (e.g., an XG Boost model).

Decision tree 200a may also proceed to decision node 206b from input decision node 202. Decision node 206b may proceed directly to an output node 208c, which causes an output based on the trained nodes and their corresponding values, weights, or representations in the trained ML model for decision tree 200. However, additional decision-making may also be performed where decision node 206b instead proceeds to decision node 206c, which causes output decision-making of decision node 208d or decision node 208e. A representation of multiple algorithms that may be used to generate input, hidden, and output layers, and their corresponding nodes, may further be seen in FIG. 2B. Thus, the training of nodes in decision tree 200a may be performed in the same or similar manner to that described in FIG. 2B.

Figure 2B:
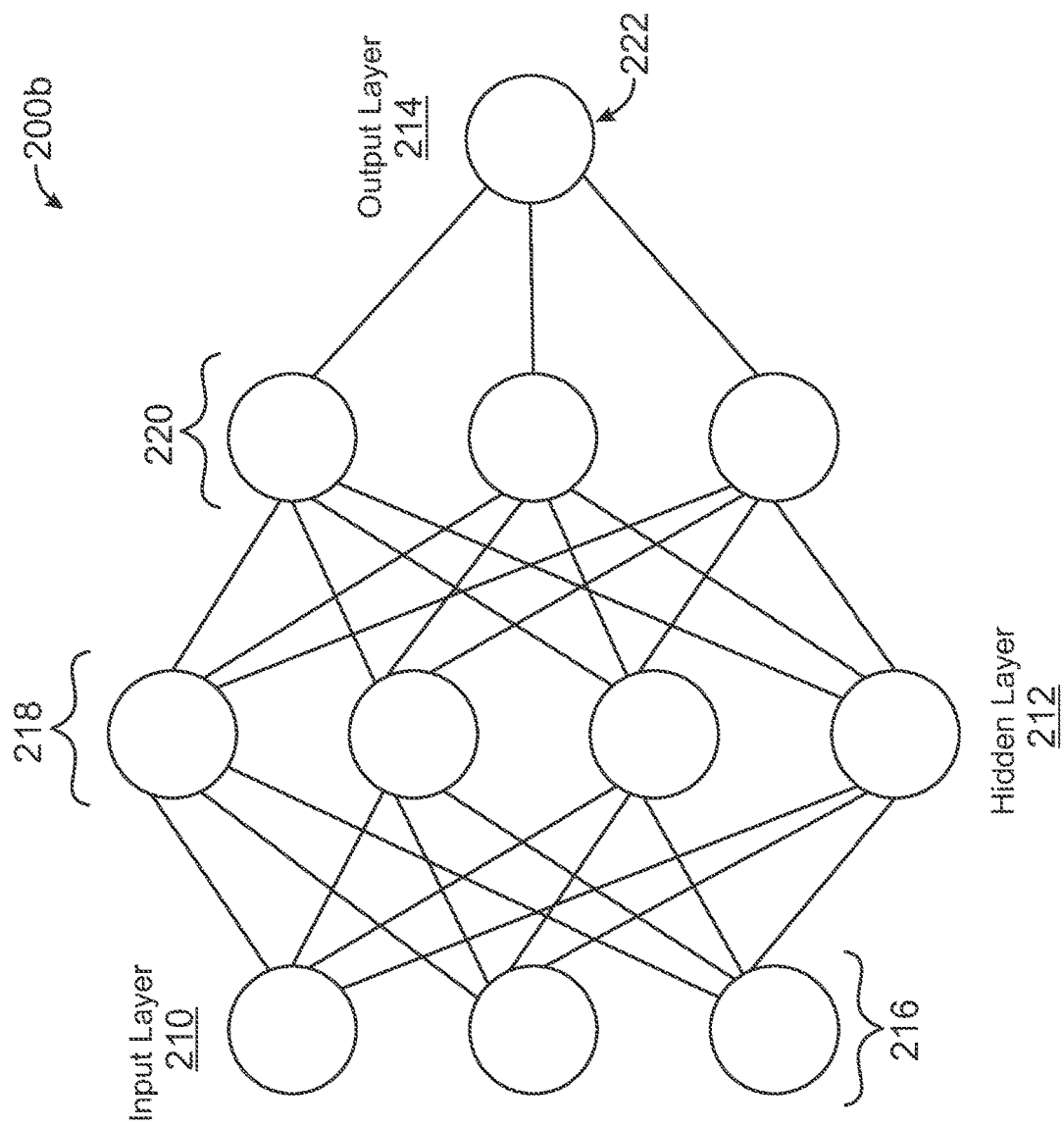
FIG. 2B is an exemplary neural network having layers that are trained to perform predictive forecasting of credit limits, according to an embodiment.

FIG. 2B is an exemplary neural network 200b having layers that are trained to perform predictive forecasting of credit limits, according to an embodiment. As shown, neural network 200b includes three groupings of layers—an input layer 210, hidden layers 212, and an output layer 214 having one or more nodes, however, different layers may also be utilized. Neural network 200b include representations of nodes interconnected to nodes in other layers in a similar manner to decision tree 200a of FIG. 2A, however, using one or more deep learning algorithms and/or combination of ML algorithms and trainers. In this regard, neural network 200b can have less or as many hidden layers as necessary or appropriate in order to provide proper decision-making, which may include using ML model training functions and algorithms.

Similar to decision tree 200a, nodes are connected to nodes in an adjacent layer. In this example, neural network 200b receives a set of input values and produces one or more output values, for example, a categorization of risk for an entity of defaulting on a credit extension or loan and/or a global balance forecast having a confidence interval of available funds. However, different, more, or less outputs may also be provided based on the training. When neural network 200b is used, each of input nodes 216 in input layer 210 may correspond to a distinct attribute or input data type derived from the training data regarding entity global balances, burn rates, staleness factors and/or time periods (e.g., for updating entity data), repayment likelihood, and the like.

In some embodiments, each of first hidden nodes 218 and second hidden nodes 220 in hidden layers 212 generates a representation, which may include a mathematical computation (or algorithm) that produces a value based on the input values of the input nodes. The mathematical computation may include assigning different weights to each of the data values received from input nodes 216. First hidden nodes 218 and second hidden nodes 220 may include different algorithms and/or different weights assigned to the input data and may therefore produce a different value based on the input values. Hidden layers 212 include two hidden layers and each node in a hidden layer for first hidden nodes 218 may be connected to the nodes in the adjacent hidden layer for second hidden nodes 220 such that nodes from input layer 210 may be connected to nodes in first hidden nodes 218, nodes in first hidden nodes 218 may be connected to nodes in second hidden nodes 220, nodes in second hidden nodes 220 may be connected to output node 222 in output layer 214. The values generated by the hidden layer nodes may be used by the output layer node to produce an output value for neural network 200b.

Neural network 200b may be trained by using training data, including data associated with entities global balances, burn rates, staleness of data and repayment, risk factors, and the like. Data may be prepared by extracting features and attributes from the data, which may also be prepared by converting data to numerical representations and vectors. Further, data may be pruned or otherwise removed of outlier data. For example, outlier transactions (e.g., those exceeding an amount or deviation from a transaction history of an entity, those occurring less than a certain requiring, and/or other outlier data). By providing training data to neural network 200b, the nodes in hidden layers 212 may be trained (adjusted) such that an optimal output (e.g., a classification) is produced in the output layer based on the training data. By continuously providing different sets of training data and penalizing neural network 200b when the output of neural network 200b is incorrect, neural network 200b (and specifically, the representations of the nodes in the hidden layer) may be trained (adjusted) to improve its performance in data classification. Adjusting neural network 200b may include adjusting the weights associated with each node in the hidden layer.

Figure 3A:
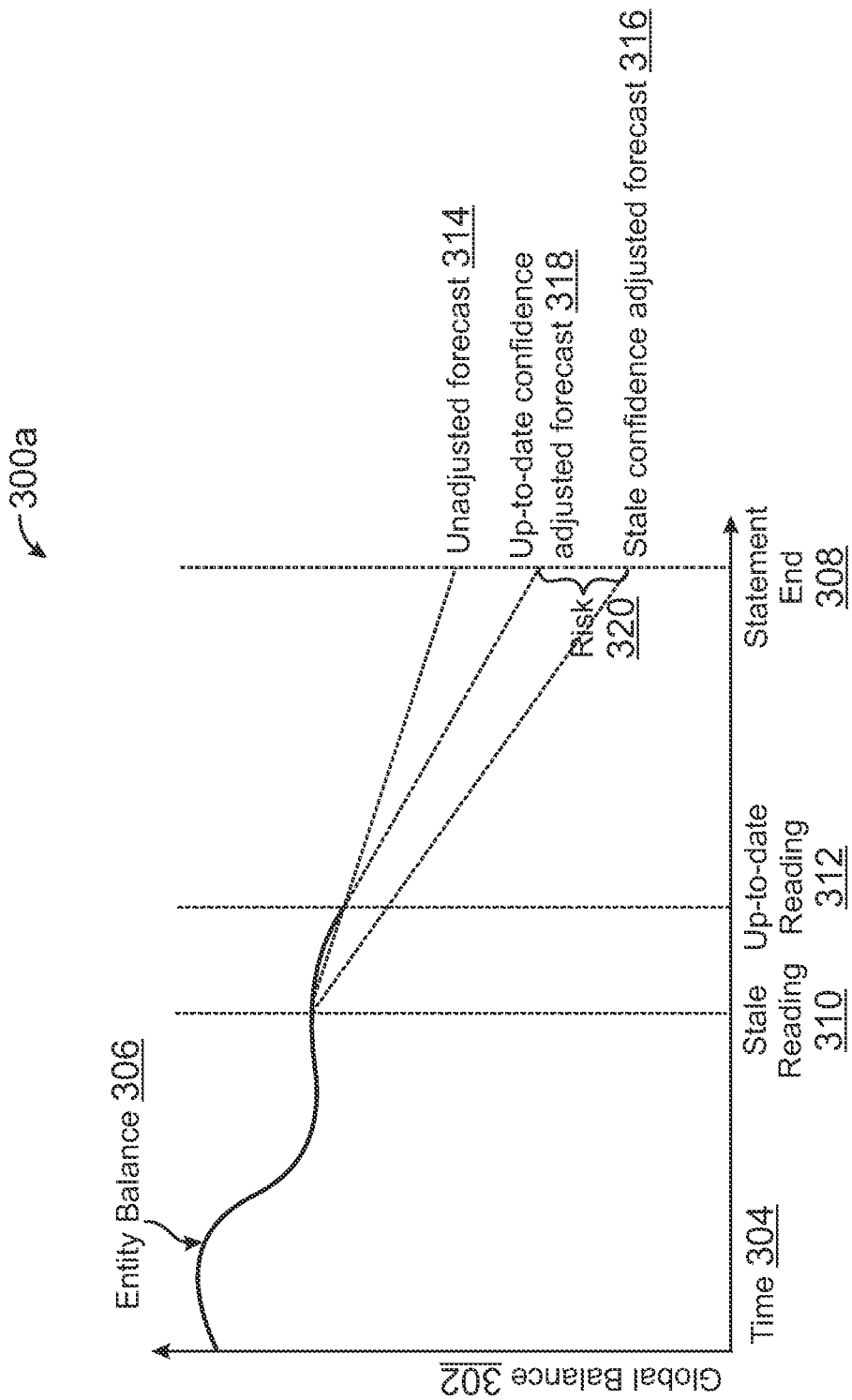
FIG. 3A is an exemplary diagram of a balance forecast determined using a machine learning model, according to an embodiment.

FIG. 3A is an exemplary diagram 300a of a balance forecast determined using a machine learning model, according to an embodiment. Diagram 300a of FIG. 3A includes a representation of a forecasted global balance at the end of a statement or billing cycle that may be predicted by credit provider server 130 using credit underwriting application 140 discussed in reference to system 100 of FIG. 1. In this regard, the forecasted global balance of available funds may be performed using one or more ML models, such as those trained in regard to the representations of FIGS. 2A and 2B.

Diagram 300a includes a graph used for prediction and/or forecasting of projected balances at a future time, such as a statement end 308. In this regard, the graph includes a global balance 302 as the y-axis and a time 304 as the x-axis. Global balance 302 is shown as fluctuating over time 304 for an entity balance 306. For example, entity balance 306 may increase as new funds are added to the account of the business or other entity (e.g., a new round of funding, additional investments, revenue, etc.) or decrease from expenses and other expenditures by the entity. In this regard, based on the movement of global balance 302 over time 304, entity balance 306 may be forecasted to be a certain global balance or amount at statement end 308. In order to predict the balance or amount of funds for entity balance 306 at statement end 308, the ML models and engines described herein may perform such predictions and forecasting.

However, based on input features and attributes for an entity's data, the ML models and/or other artificial intelligence systems (e.g., rule-based engines, neural networks, and the like) may generate different decisions. For example, initially, an unadjusted forecast 314 may be determined based on initial risk rules without ML model forecasting, as described herein. Unadjusted forecast may be based on conventional risk analysis and/or risk projection rules and engines. This may correspond to a conventional projection that may initially be determined by an underwriting system when determining risk of credit or loan repayment. Thus, unadjusted forecast 314 may correspond to an initial level of credit extended to an entity by the underwriting system of the credit service provider.

However, using the ML models, updated forecasted projections may be made, which may include a confidence interval based on staleness of an entity's banking data and other factors (e.g., changes to burn rate, global balance adjustments, and the like). For example, at a first time, additional global balance data may be received at a time for stale reading 310. If this information is not adjusted up to statement end 308, a stale confidence adjusted forecast 316 may be determined. This may be determined by the ML model(s) for global balance forecasting in order to account for a risk 320 caused by the stale entity data. Thus, staleness of the data may cause ML models to reduce a credit limit for extended credit in order to account for risk 320 in providing a higher forecast of global balance 302 for entity balance 306.

However, at a later time along the axis for time 304, up-to-date reading 312 may provide additional entity data. Since this data is provided later and closer to statement end 308, a more accurate prediction or forecast of global balance 302 for entity balance 306 and/or less risk may be involved in providing a higher prediction of global balance 302 may be determined by the ML model(s). For example, up-to-date reading 312 may be used to provide an up-to-date confidence adjusted forecast 318 that accounts for less risk and/or risk 320 for a confidence interval associated with predicting global balance 302 for entity balance 306. Thus, up-to-date confidence adjusted forecast 318 may correspond to a higher predicted global balance and therefore an increased credit limit when underwriting credit extended to the entity.

Figure 3B:
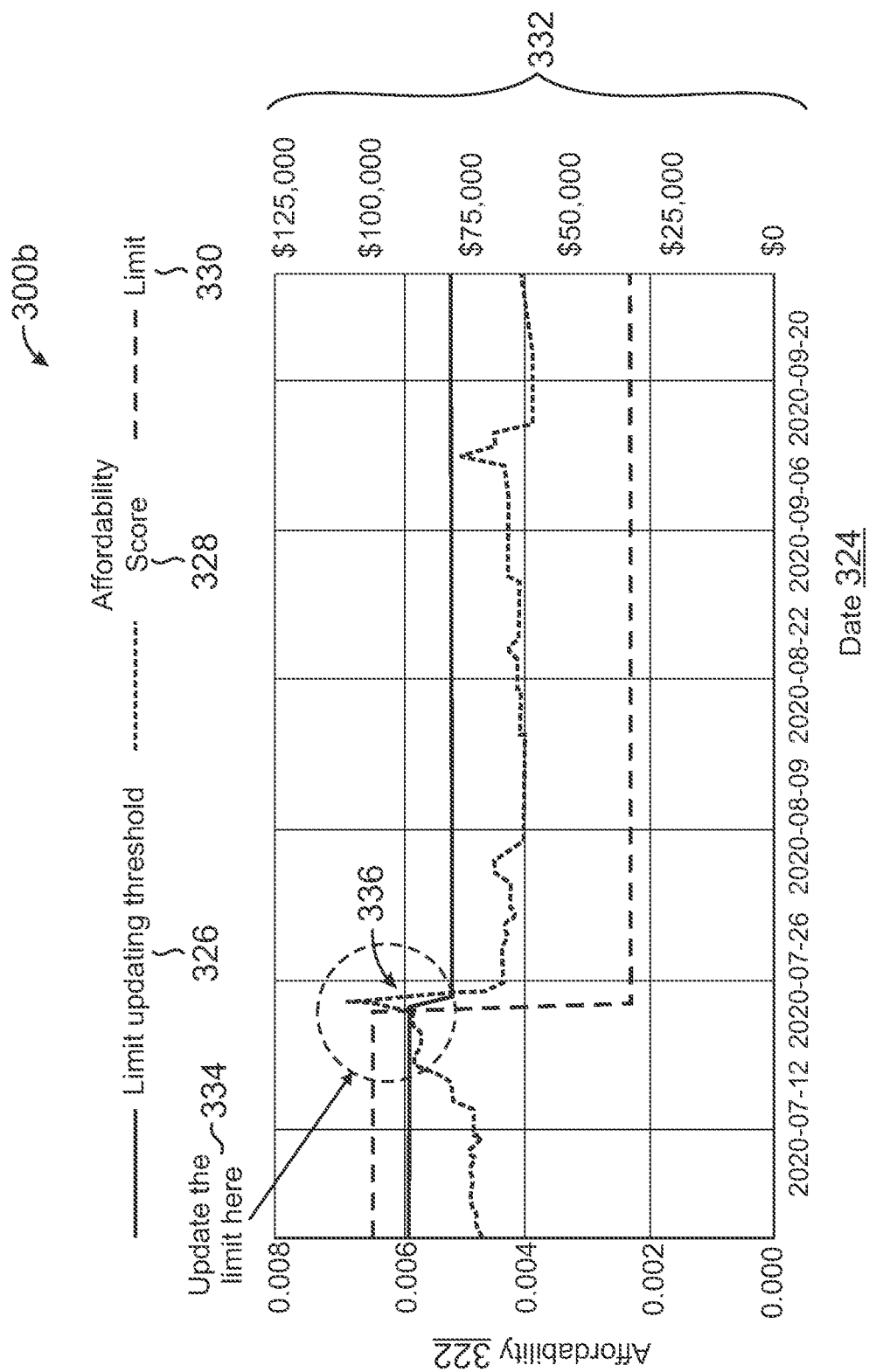
FIG. 3B is an exemplary diagram of a probability of default determined using a machine learning model, according to an embodiment.

FIG. 3B is an exemplary diagram 300b of a probability of default determined using a machine learning model, according to an embodiment. Diagram 300b of FIG. 3B includes a representation of a PD (e.g., a probability of default or delinquency for an entity) over a timeline or for a billing cycle (e.g., during the billing cycle and when approaching a repayment date), which may be predicted by credit provider server 130 using credit underwriting application 140 discussed in reference to system 100 of FIG. 1. In this regard, the PD may adjust a credit limit using one or more ML models, such as those trained in regard to the representations of FIGS. 2A and 2B.

In diagram 300b, a ML model may be trained for cash-based PD underwriting using a ML technique and algorithm, such as tree-based ML methods and algorithms. This may correspond to an XG boost model, however, other models may also be used including GBM and other tree-based algorithms. The cash-based PD underwriting ML model may provide additional stabilizations over a global balance forecasting ML model, such as the one described with regard to diagram 300a of FIG. 3A. This may be done by utilizing an affordability 322 that corresponds to a score, metric, or value determined from a ML model. An entity's score for affordability 322 therefore limits changing of credit limits over time and may provide more stable balances over a time period (e.g., a 90-day time period or for a billing cycle). Thus, affordability 322 may correspond to an output value of a ML model trained to determine which risk factors are most predictive of delinquency. This ML model therefore provides a risk estimate as an output for affordability 322, which may be reassessed for customer risk with up-to-date information (e.g., new daily information, such as global cash balances, burn rates, expenses and historical spend, and the like). Without updating with more up-to-date information, a staleness factor may also affect affordability 322, which may change the corresponding score for affordability 322 for an entity.

In this regard, affordability 322 may be determined by a ML model that is tuned to maximize limit stability, maximize credit limits to cover historical spend and other past expenses, and minimize credit loss when limits are set too high (e.g., an entity defaults on repayment). In this regard, when the ML model determines affordability 322, an optimization may be executed using historical data and available global cash balances to balance between the aforementioned three aspects. Affordability 322 therefore provides a metric to determine when dynamic adjustment of a credit balance should be performed.

In diagram 300b, affordability 322 is plotted against a date 324 so that the chart of diagram 300b shows changes in affordability 322 over time. This is used to dynamically adjust credit limits or other balances or limits of available funds (e.g., an extendable loan or the like). A solid line is shown as a limit updating threshold 326, which may be a threshold based on risk rules and/or models that indicates when affordability 322 exceeds limit updating threshold 326, a credit limit or balance should be dynamically adjusted to reduce a credit limit. In other embodiments, when below limit updating threshold for a time period, such as a significant time period (e.g., one or multiple billing cycles) that indicates a credit limit is too low, dynamic adjustment may include increasing a credit limit.

An affordability score 328 for an entity is therefore plotted in diagram 300b using affordability 322 over date 324. This is shown with limit updating threshold 326 to determine if affordability score 328 for the entity exceeds limit updating threshold 326, and a dynamic adjustment of a credit limit is required. A limit 330 shows a current credit limit or other available credit or loan for an entity and may be adjusted based on limit amounts 332. When affordability score 328 exceeds limit updating threshold 326, limit 330 dynamically decreases to provide a lower overall credit limit and reduce risk. This is caused when the ML model predictive output for affordability 322 indicates that the entity is riskier of defaulting or being delinquent in repayment (e.g., their PD score for affordability 322 indicates higher likelihood of delinquency).

As shown in diagram 300b, for date 324 of Jul. 26, 2020, affordability score 328 for an entity exceeds limit updating threshold 326. For example, at a location in diagram 300b for update the limit here 334, affordability score 328 as the dashed line exceeds limit updating threshold 326 at a point 336. Point 336 may be caused by a change to a global cash balance (e.g., a reduction of available cash, a large purchase that decreases a bank account, or the like), a change in historical spend or expenses, and the like. This therefore indicates a higher likelihood or probability of being delinquent in repayment or defaulting on the credit and repayment. Thus, limit 330 is shown as decreasing from $100,000 to $30,000 with limit amounts 332. This corresponds to a dynamic adjustment of a credit limit using the cash-based PD ML model for predicting affordability 322.

Figure 4:
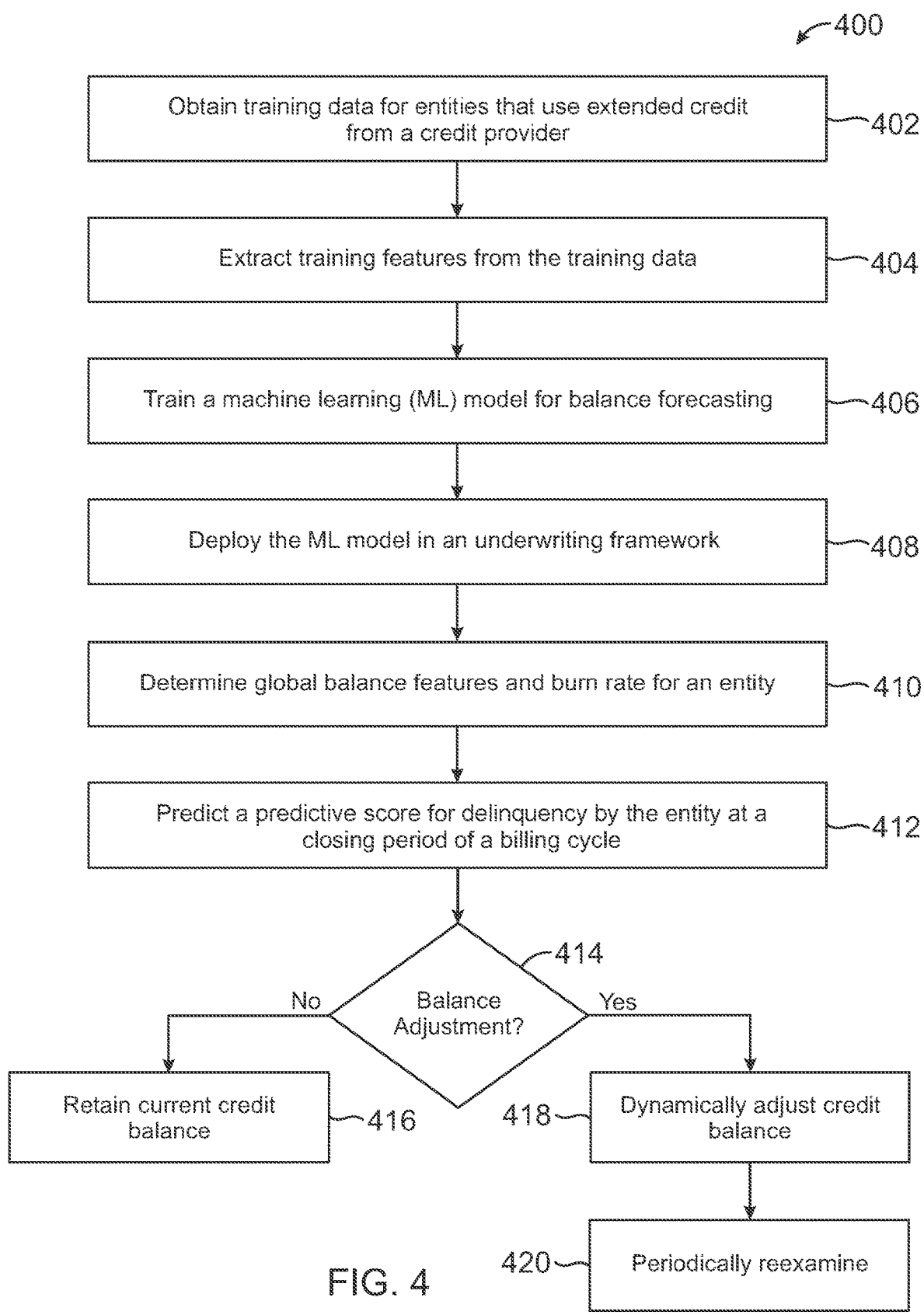
FIG. 4 is an exemplary flowchart for automatic adjustment of limits based on machine learning forecasting, according to an embodiment.

FIG. 4 is an exemplary flowchart 400 for automatic adjustment of credit limits based on machine learning forecasting, according to an embodiment. Note that one or more steps, processes, and methods of flowchart 400 described herein may be omitted, performed in a different sequence, or combined as desired or appropriate.

At step 402 of flowchart 400, training data for entities using extending credit from a credit provider is obtained. Training data may correspond to transactions, expense behaviors, and/or global balance increases, such as those associated with using and/or receiving a global balance of funds available to the entities. The training data may therefore include changes to a global balance over time, which may also include burn rate and the like. At step 404, training features are extracted from the training data, where the training features may correspond to data attributes, features, values, and the like that may be extracted for use in training nodes and layers within an ML model for decision-making. Thus, the training features may correspond to those features and data required by one or more mathematical computations or algorithms to train nodes of the ML model to perform decision-making and/or provide additional data to interconnected nodes for decision-making.

At step 406, an ML model for balance forecasting is trained. The ML model may be trained using the extracted features, attributes, and values from the training data. The ML model may correspond to an exponential smoothing model, and XG Boost model for PD (e.g., a probability of default or delinquency) in available funds for credit repayment at a data, or the like. The ML model may be trained and retrained or provided feedback for decision-making when results are not accurate or do not reach sufficient levels of accuracy. In this regard, the ML model may be trained to provide a predictive output or forecast on one or more anticipated global balances of an entity at a certain future date based on the input features. Where the input features include up-to-date information, a staleness factor may be zero, negligible, or otherwise indicate the current nature of the data. However, a staleness factor may further affect predictive decision-making and forecasting where the data may be stale, a certain number of days or other time period old, or the like.

At step 408, the ML model is deployed in an underwriting framework. Deployment may include implementing the ML model in an intelligent decision-making framework for underwriting credit amounts and limits extended to users. Once deployed, the underwriting framework may be used to perform predictive determination of future global balances for entities, which may assist in underwriting and acceptable risk for extending credit to entities. Thus, at step 410, global balance features and a burn rate for an entity are determined. This may be retrieved from account data and/or uploaded or submitted data for the entity. However, integrations with one or more banking computing networks and/or systems may also be used to retrieve the data for the balances. Where a connection to the banking networks or systems is severed or unavailable, stale data from past available data may be used, but a staleness factor may also be considered for predicting and/or forecasting future global balances of the entity at particular dates.

At step 412, a predictive score for delinquency by the entity at a closing period of a billing cycle is predicted. In some embodiments, a balance forecast may be determined, which may correspond to an expected balance, which may correspond to a confidence interval having a range for an expected balance at the closing period. The confidence interval may have different sections or portions corresponding to different likelihood to repayment. For example, an upper 25% may have a low likelihood of repayment, and therefore be excluded under risk rules. However, other lower sections and/or global balance amounts may be predicted and used for underwriting based on acceptable risk. At step 414, it is determined, from the predictive score, whether a balance adjustment is required.

If no balance adjustment is required based on the predictive score (e.g., the likelihood of having an available cash balance is the same or within an acceptable margin of error from a current credit limit of extended credit or other loan amount), then flowchart 400 may proceed to step 416, where the current credit balance and/or limit is retained. Thus, the credit balance extended to the entity may not be adjusted and may be maintained at a certain level. This may also occur where a model predicts, based on changes to the global balance, that an affordability score does not exceed a threshold requiring a reduction in the credit limit due to a risk score for the predictive model (e.g., exceeding a higher risk entity categorization from the risk model).

However, if a balance adjusting is required at step 414, flowchart 400 may proceed to step 418 where a credit balance and/or limit is dynamically adjusted. This may be performed by dynamically adjusting, without user input and/or request, the credit balance to reflect a predicted or forecasted available global balance of funds at a particular date or a PD score for repayment at that particular date. The new credit limit may be adjusted dynamically at particular time intervals and/or when new data is available and may reflect the currently forecasted global balance and/or affordability score. Where a confidence interval in the global balance is used, a particular global balance (and thus credit limit) may be selected based on risk assessments and/or sections of the confidence interval that are acceptable to the underwriting system. Similarly, an affordability score may be used to determine that an entity exceeds a threshold due to risk for the entity changing, which may cause the credit limit to be impacted and reduced until a further billing cycle.

Thus, using various embodiments discussed herein, companies can better (e.g., more efficiently and more accurately) predict and/or forecast upcoming data, which allows for more intelligent decision-making and provision of services. This may reduce risk for the companies and provide intelligent decisions that automate human functioning to remove user input and decisions when providing services to entities.

Figure 5:
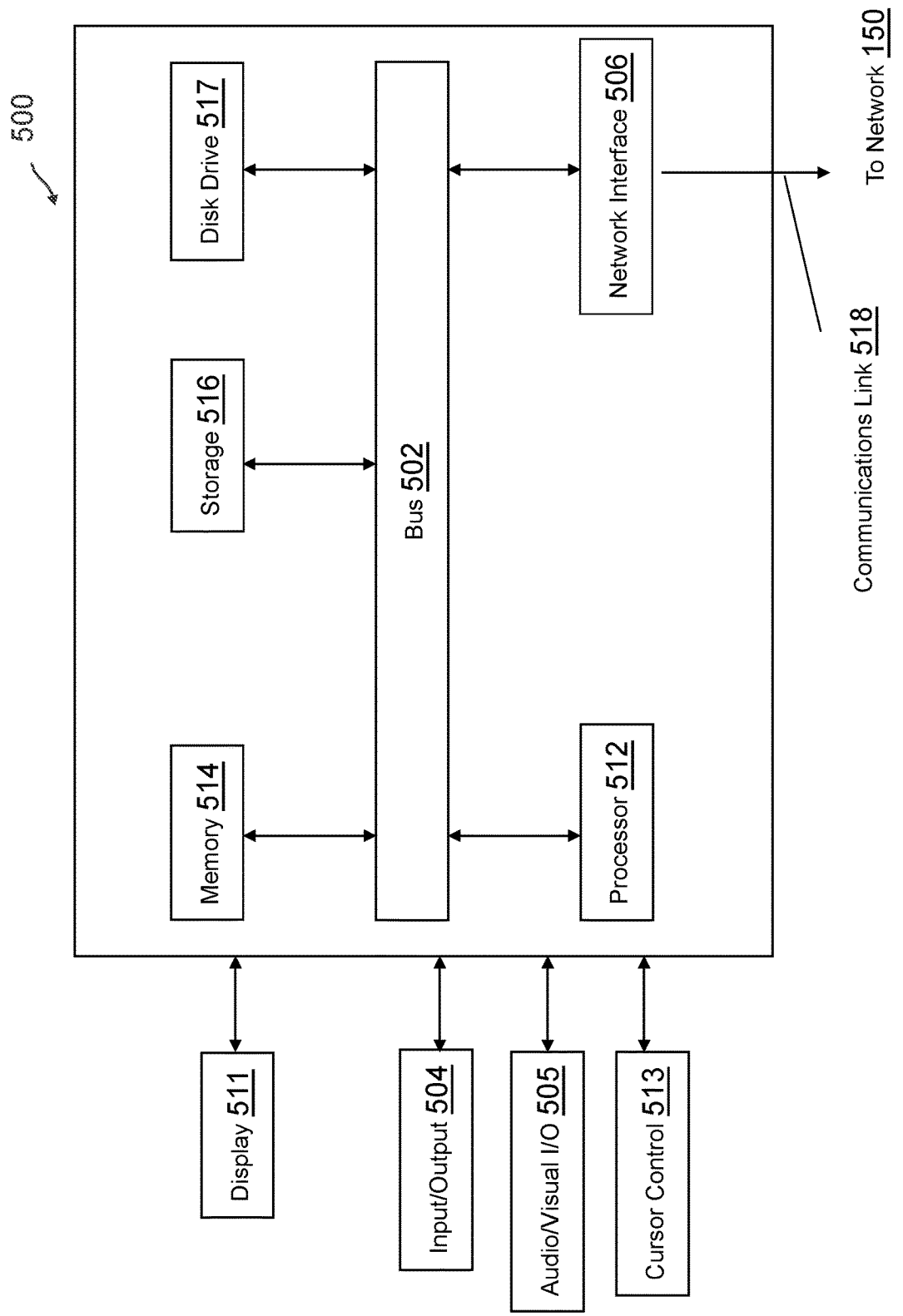
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory storing instructions; and
    one or more hardware processors coupled to the non-transitory memory and configured to read the instructions from the non-transitory memory to cause the system to perform operations comprising:
        training one or more nodes for each of a plurality of ML model layers of a machine learning (ML) model for predicting a plurality of predictive scores using training data from a plurality of entities and a tree-based algorithm training, wherein the training comprises at least one of applying a plurality of weights to the one or more nodes, recursively retraining the one or more nodes, or receiving feedback for adjusting values for the one or more nodes;
        accessing, for an entity, a credit account that provides an available credit for electronic transaction processing via the system;

determining a global balance of funds available to the entity from an additional account with a financial entity;

determining an account staleness factor associated with a time since a last update of the global balance of the funds available to the entity from the additional account;

accessing the ML model comprising the plurality of ML model layers each having the one or more nodes, wherein an input layer of the plurality of ML model layers comprises a plurality of features extractable from 1) the global balance and 2) the account staleness factor;

calculating, using the ML model and based on the plurality of features associated with the global balance and the account staleness factor, a predictive score for a delinquency by the entity at a closing time for a billing cycle associated with the available credit for the credit account, and wherein the predictive score is based on one or more risk factors for the ML model;

dynamically adjusting the available credit for the credit account based on the balance forecast;

detecting, over a period of time, usage of the available credit by the entity;

retraining the ML model based on the detected usage, wherein the retraining comprises:
  modifying at least one value for at least one of the one or more nodes based on the detected usage or a feedback from the entity based on the dynamically adjusted available credit, and
  adjusting the ML model for a performance improvement based on the at least one modified value;

receiving an update to the global balance of the funds;

updating the account staleness factor to a current time of receiving the update;

recalculating, using the ML model, the predictive score for the entity based on the update and the updated account staleness factor; and dynamically readjusting the available credit based on the recalculated predictive score.

2. The system of claim 1, wherein the update is received, and the predictive score is recalculated, at a time closer to a closing time for the billing cycle than a time when the predictive score is calculated for dynamically adjusting the available credit.

3. The system of claim 2, wherein the predictive score further comprises a predictive confidence interval, and wherein the available credit is dynamically adjusted when the recalculated predictive score is outside the predictive confidence interval when the available credit was last set.

4. The system of claim 2, wherein the predictive score further comprises a predictive confidence interval, and wherein the predictive score is reduced to a smaller range at the closing time than the time when the predictive score is calculated.

5. The system of claim 1, wherein the ML model is trained based on a plurality of additional global balances and a plurality of spending behaviors for the plurality of entities.

6. The system of claim 5, wherein prior to training the ML model, the operations further comprise:
  removing at least one outlier transaction from the plurality of spending behaviors for the plurality of entities.

7. The system of claim 1, wherein the ML model uses one of a gradient boosting machine model or an XG boost model.

8. The system of claim 1, wherein the global balance of the funds and the account staleness factor are determined using an integration with a computing system for the financial entity that retrieves data for the additional account at periodic time intervals.

9. A method comprising:
  training one or more nodes for each of a plurality of ML model layers of a machine learning (ML) model for predicting a plurality of predictive scores using training data from a plurality of entities and a tree-based algorithm training, wherein the training comprises at least one of applying a plurality of weights to the one or more nodes, recursively retraining the one or more nodes, or receiving feedback for adjusting values for the one or more nodes;

accessing, for an entity, a credit account that provides an available credit for electronic transaction processing via a credit provider system;

determining a balance of funds available to the entity from an additional account with a financial entity;

determining an account staleness factor associated with a time since a last update of the balance of the funds available to the entity from the additional account;

accessing the ML model comprising the plurality of ML model layers each having the one or more nodes, wherein an input layer of the plurality of ML model layers comprises a plurality of features extractable from 1) the balance and 2) the account staleness factor;

calculating, using the ML model and based on the plurality of features associated with the balance and the account staleness factor, a balance forecast for the entity at a closing time for a billing cycle associated with the available credit for the credit account, and wherein the balance forecast comprises a predictive confidence interval at the closing time for the balance based on one or more risk factors for the ML model;

dynamically adjusting the available credit for the credit account based on the balance forecast;

detecting, over a period of time, usage of the available credit by the entity;

retraining the ML model based on the detected usage, wherein the retraining comprises:
    modifying at least one value for at least one of the one or more nodes based on the detected usage or a feedback from the entity based on the dynamically adjusted available credit, and
    adjusting the ML model for a performance improvement based on the at least one modified value;

receiving an update to the balance of the funds;

updating the account staleness factor to a current time of receiving the update;

recalculating, using the ML model, the predictive score for the entity based on the update and the updated account staleness factor; and dynamically readjusting the available credit based on the recalculated predictive score.

10. The method of claim 9, wherein the update is received, and the balance forecast is recalculated, at a time closer to a closing time for the billing cycle than a time when the balance forecast is calculated for dynamically adjusting the available credit.

11. The method of claim 10, wherein the predictive confidence interval further comprises a predictive score, and wherein the available credit is dynamically adjusted when the predictive score is outside the predictive confidence interval when the available credit was last set.

12. The method of claim 10, wherein the predictive confidence interval further comprises a predictive score, and wherein the predictive score is reduced to a smaller range at the closing time than the time when the predictive score is calculated.

13. The method of claim 9, wherein the ML model is trained based on a plurality of additional balances and a plurality of spending behaviors for the plurality of entities.

14. The method of claim 13, wherein prior to training the ML model, the method further comprises:
removing at least one outlier transaction from the plurality of spending behaviors for the plurality of entities.

15. The method of claim 9, wherein the ML model uses one of an exponential smoothing model or an XG boost model.

16. The method of claim 9, wherein the balance of the funds and the account staleness factor are determined using an integration with a computing system for the financial entity that retrieves data for the additional account at periodic time intervals.

17. A non-transitory machine-readable medium having stored thereon machine-readable instructions executable to cause a machine to perform operations comprising:
training one or more nodes for each of a plurality of ML model layers of a machine learning (ML) model for predicting a plurality of predictive scores using training data from a plurality of entities and a tree-based algorithm training, wherein the training comprises at least one of applying a plurality of weights to the one or more nodes, recursively retraining the one or more nodes, or receiving feedback for adjusting values for the one or more nodes;
accessing, for an entity, a credit account that provides an available credit for electronic transaction processing via a credit provider system;
determining a global balance of funds available to the entity from an additional account with a financial entity;
determining an account staleness factor associated with a time since a last update of the global balance of the funds available to the entity from the additional account;
accessing the ML model comprising the plurality of ML model layers each having the one or more nodes, wherein an input layer of the plurality of ML model layers comprises a plurality of features extractable from 1) the global balance and 2) the account staleness factor;
calculating, using the ML model and based on the plurality of features associated with the global balance and the account staleness factors, a balance forecast for the entity at a closing time for a billing cycle associated with the available credit for the credit account, and wherein the balance forecast comprises a predictive confidence interval at the closing time for the global balance based on one or more risk factors for the ML model;
dynamically adjusting the available credit for the credit account based on the balance forecast;
detecting, over a period of time, usage of the available credit by the entity; and
retraining the ML model based on the detected usage, wherein the retraining comprises:
modifying at least one value for at least one of the one or more nodes based on the detected usage or a feedback from the entity based on the dynamically adjusted available credit, and
adjusting the ML model for a performance improvement based on the at least one modified value;
receiving an update to the global balance of the funds;
updating the account staleness factor to a current time of receiving the update;
recalculating, using the ML model, the predictive score for the entity based on the update and the updated account staleness factor; and
dynamically readjusting the available credit based on the recalculated predictive score.

18. The system of claim 1, wherein the operations further comprise:
receiving a change to an expense rate of the funds available to the entity,
wherein the predictive score is further recalculated based on the change to the expense rate.

19. The method of claim 9, further comprising:
receiving a change to an expense rate of the funds available to the entity,
wherein the predictive score is further recalculated based on the change to the expense rate.

20. The non-transitory machine-readable medium of claim 17, wherein the operations further comprise:
receiving a change to an expense rate of the funds available to the entity,
wherein the predictive score is further recalculated based on the change to the expense rate.

21. The non-transitory machine-readable medium of claim 17, wherein the ML model is trained based on a plurality of additional global balances and a plurality of spending behaviors for the plurality of entities, and wherein the operations further comprise:
removing at least one outlier transaction from the plurality of spending behaviors for the plurality of entities.

22. The non-transitory machine-readable medium of claim 17, wherein the update is received, and the predictive score is recalculated, at a time closer to a closing time for the billing cycle than a time when the predictive score is calculated for dynamically adjusting the available credit, wherein the predictive score further comprises a predictive confidence interval, and wherein the predictive score is reduced to a smaller range at the closing time than the time when the predictive score is calculated.

* * * * *